(12) United States Patent
Rocha-Alvarez et al.

(10) Patent No.: US 6,591,850 B2
(45) Date of Patent: Jul. 15, 2003

(54) METHOD AND APPARATUS FOR FLUID FLOW CONTROL

(75) Inventors: Juan Carlos Rocha-Alvarez, Sunnyvale, CA (US); Chen-An Chen, Milpitas, CA (US); Shankar Venkataraman, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/895,104

(22) Filed: Jun. 29, 2001

(65) Prior Publication Data

US 2003/0005958 A1 Jan. 9, 2003

(51) Int. Cl.⁷ .............................................. G05D 11/00
(52) U.S. Cl. ........................ 137/9; 137/101; 137/101.19
(58) Field of Search ........................... 137/101, 101.19, 137/101.21, 98, 100, 9

(56) References Cited

U.S. PATENT DOCUMENTS

| | | | | |
|---|---|---|---|---|
| 2,956,577 A | * | 10/1960 | Kirkham ...................... 137/101 |
| 3,272,217 A | * | 9/1966 | Young .................... 137/101.19 |
| 3,556,126 A | * | 1/1971 | Oswald .................. 137/118.04 |
| 4,785,962 A | | 11/1988 | Toshima ...................... 220/260 |
| 4,819,167 A | | 4/1989 | Cheng et al. .......... 364/167.01 |
| 4,828,224 A | | 5/1989 | Crabb et al. ................. 251/298 |
| 4,908,095 A | | 3/1990 | Kagatsume et al. ........ 156/643 |
| 4,951,601 A | | 8/1990 | Maydan et al. ............. 118/719 |
| 5,067,218 A | | 11/1991 | Williams .................... 29/25.01 |
| 5,092,728 A | | 3/1992 | Crabb et al. ................. 414/217 |
| 5,120,019 A | | 6/1992 | Davis, Jr. .................... 251/193 |
| 5,133,284 A | | 7/1992 | Thomas et al. ............. 118/719 |
| 5,156,521 A | | 10/1992 | Crabb et al. ................. 414/786 |
| 5,226,632 A | | 7/1993 | Tepman et al. ........... 251/335.3 |
| 5,275,303 A | | 1/1994 | Szalai ......................... 220/264 |
| 5,286,296 A | | 2/1994 | Sato et al. ................... 118/719 |
| 5,288,379 A | | 2/1994 | Namiki et al. .......... 204/192.12 |
| 5,292,393 A | | 3/1994 | Maydan et al. ............. 156/345 |
| 5,302,209 A | | 4/1994 | Maeda et al. ................ 118/719 |
| 5,344,542 A | | 9/1994 | Maher et al. ........... 204/298.15 |
| 5,363,872 A | | 11/1994 | Lorimer .......................... 137/1 |
| 5,435,682 A | | 7/1995 | Crabb et al. ................. 414/217 |
| 5,469,035 A | | 11/1995 | Lowrance ................. 318/568.1 |
| 5,470,390 A | * | 11/1995 | Nishikawa et al. ......... 118/715 |
| 5,494,494 A | | 2/1996 | Mizuno et al. ............ 29/25.01 |
| 5,505,779 A | | 4/1996 | Mizuno et al. ............. 118/719 |
| 5,616,208 A | | 4/1997 | Lee ............................. 156/345 |
| 5,624,536 A | | 4/1997 | Wada et al. ............ 204/298.11 |
| 5,782,260 A | * | 7/1998 | Jacobs et al. ........... 137/118.02 |
| 5,855,681 A | | 1/1999 | Maydan et al. ............. 118/719 |
| 6,143,082 A | | 11/2000 | McInerney et al. ......... 118/719 |
| 6,210,482 B1 | | 4/2001 | Kitayama et al. ........... 118/715 |
| 6,214,119 B1 | | 4/2001 | Maher et al. ................ 118/719 |
| 6,224,679 B1 | | 5/2001 | Sasaki et al. ................ 118/719 |

OTHER PUBLICATIONS

Z. Shiller and S. Dubowski, "Robot Path Planning with Obstacles, Actuator, Gripper, and Payload Constraints," International Journal of Robotics Research, vol. 8, No. 6. Dec. 1989, pp.3–18.

Z. Shiller and H.H. Lu, "Computation of Path Constrained Time Optimal Motions With Dynamic Singularities," Transactions of the ASME, Journal of Dynamic Systems, Measurement, and Control, vol. 114. Mar. 1992, pp. 34–40.

Mattson Brochure, no date.

Novellus Brochure, no date.

* cited by examiner

*Primary Examiner*—Stephen M. Hepperle
(74) *Attorney, Agent, or Firm*—Moser, Patterson & Sheridan

(57) ABSTRACT

The invention provides a method and apparatus to control fluids such as process gases into two or more substrate process chambers. In one aspect, the gas flow from a first supply to a first processing region is used to control the gas flow of a second supply to a second processing region where the total gas flow is about equal to the total of the gas flows into both the first and second processing regions. In another aspect, the gas flow rate from the first supply for the first processing region is about equal to the gas flow rate for the second supply to the second processing region.

28 Claims, 8 Drawing Sheets

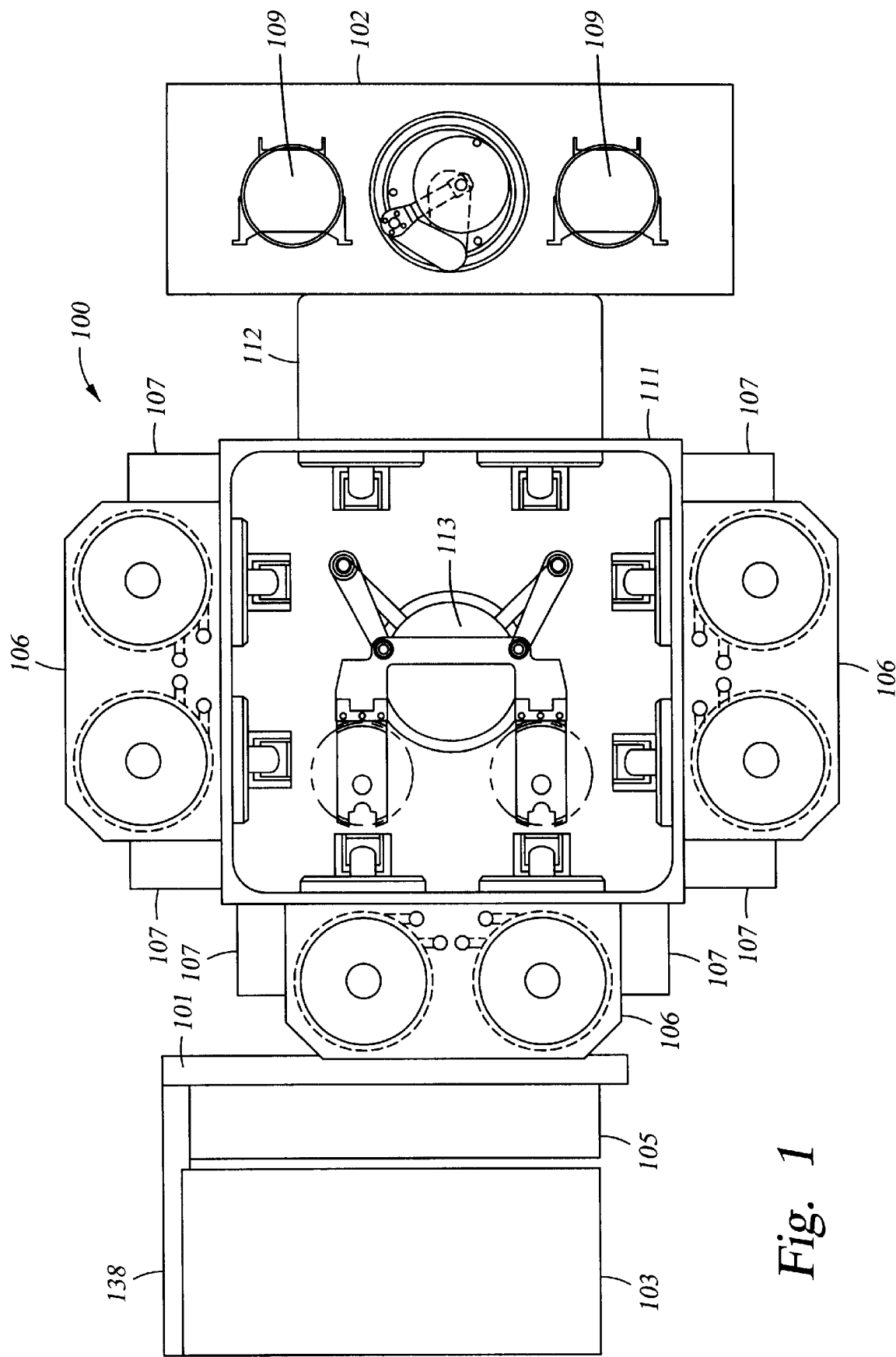

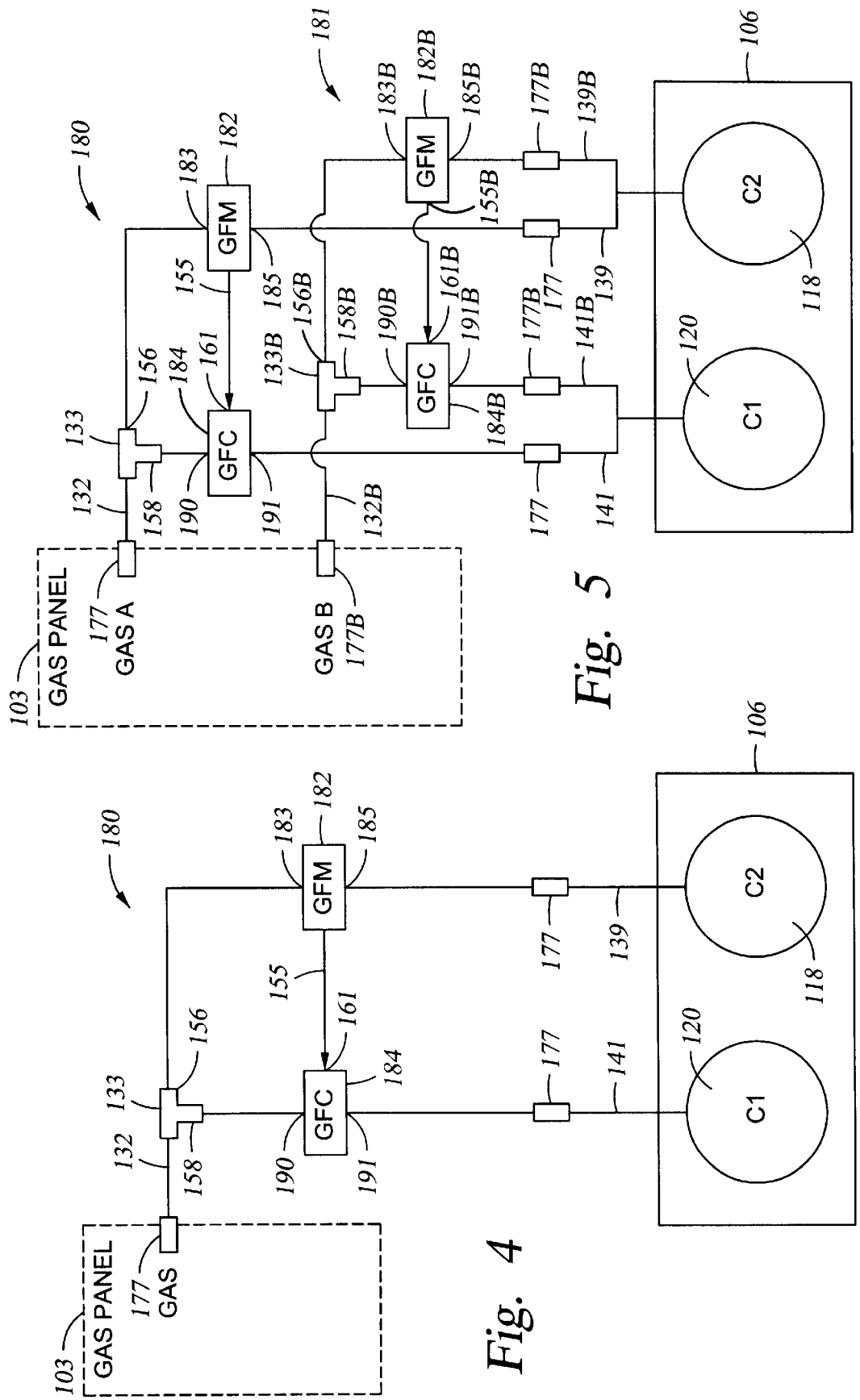

METHOD AND APPARATUS FOR FLUID FLOW CONTROL

BACKGROUND OF THE INVENTION

1. Field of the Invention

The invention relates to a method and apparatus for fluid flow control. More specifically, the invention relates to splitting a fluid flow such as a gas flow into pre-selected proportions.

2. Background of the Related Art

A chip manufacturing facility is composed of a broad spectrum of technologies. Cassettes containing semiconductor substrates are routed to various stations in the facility where they are either processed or inspected. Semiconductor processing generally involves the deposition of material onto and removal ("etching") of material from substrates. Typical processes include chemical vapor deposition (CVD), physical vapor deposition (PVD), electroplating, chemical mechanical planarization (CMP), etching and others.

Conventional substrate processing systems often process substrates serially, ie., one substrate at a time. Unfortunately, processing substrates serially results in throughput limitations corresponding to an individual substrate process time. To overcome the limitations of serial processing, batch (i.e., parallel) processing is often employed. Batch processing allows several substrates to be processed simultaneously using common fluids such as process gasses, chambers, processes, etc. thereby decreasing equipment costs, and increasing throughput. Ideally, batch-processing systems expose each of the substrates to an identical process environment whereby each substrate receives the same process gases and plasma densities for uniform processing of the batch.

One method for batch processing is performed in large single chamber batch-processing systems designed to accommodate more than one substrate. Unfortunately, as the substrates within a single batch-processing chamber share a common area, process gasses and plasma dedicated to one substrate will often intermix with the process gases and plasma dedicated to another substrate causing process variations within each substrate batch. To minimize the intermixing issue, internal chamber divider walls may be used that form sub-chambers within the single batch-processing chamber. However, chamber divider walls increase the cost and complexity of the batch-processing chamber. To eliminate the need for divider walls, multiple single-substrate processing chambers in tandem are often used to provide the benefits of batch processing and uniformity while allowing the careful control and isolation of the process environment for each substrate within a batch.

To control the individual process for each substrate within a batch-processing environment, individual gas, power, and plasma systems are often incorporated within the processing chambers or sub-chambers. In addition, there is usually an individual gas delivery system for each gas or mixture of gases. To reduce the cost of multiple gas supplies and process controls each individual processing region generally has common gas connections and sources. For example, the gas supplies for each sub-chamber or single-substrate processing chamber generally are coupled to a common gas source eliminating the need for multiple gas sources for the same gas or mixture of process gases. Unfortunately, due to variations in gas flow within each individual gas delivery system, each gas delivery system must be individually monitored and calibrated so that each substrate receives the same amount of process gas flow for each process step, according to the process regime. The variations in gas flow rates for each chamber are due to the flow resistance that depends upon the size of pipe used, length of pipe, and pipe joints, valves, etc. of the gas delivery systems.

To alleviate the calibration and control of each individual gas system for the single chamber or multi-chamber types of batch-processing systems, a centralized gas control system is often used to monitor and control the gas flow. Unfortunately, centralized gas control systems generally increase the complexity and cost of the processing systems. Thus, regardless of the batch processing system used, conventional individual gas delivery systems are often complex, require individual or centralized monitoring, require individual calibration, and generally increase the cost of production.

Therefore, there is a need for method and apparatus to provide a uniform fluid flow to each chamber within a batch-processing system in a simple and cost effective manner.

SUMMARY OF THE INVENTION

Aspects of the invention generally provide a fluid delivery system for controlling and dividing fluids such as process gases used in substrate processing. In one embodiment, the invention provides an apparatus for dividing a gas flow from a gas source, including a first gas line connected to a gas source, a gas flow meter positioned on the first gas line to output a signal corresponding to a gas flow rate through the first gas line, a second gas line connected to the gas source, and a gas flow controller positioned on the second gas line and responsive to the signal from the gas flow meter to divide the gas flow from the gas source.

In another embodiment, the invention provides an apparatus for dividing a gas flow from a gas source output into a tandem-processing chamber, including a first gas line connecting a gas source output to a first processing region of a tandem processing chamber, a gas flow meter positioned on the first gas line to output a signal corresponding to a first gas flow rate through the first gas line, a second gas line connecting the gas source output to a second processing region of the tandem processing chamber, and a gas flow controller positioned on the second gas line and responsive to the signal from the gas flow meter to divide the gas from the gas source output between the first gas flow rate through the first gas line to the first processing region and a second gas flow rate through the second gas line to the second processing region.

In still another embodiment, the invention provides a method of dividing a fluid flow from a fluid source, including measuring a first fluid flow rate through a first fluid line connected to the fluid source, and controlling a second fluid flow rate through a second fluid line connected to the fluid source using the first fluid flow rate through the first fluid line.

In another embodiment, the invention provides a method of dividing a gas flow in a tandem processing chamber including measuring a first gas flow rate from a gas source through a first gas line coupled to a first processing region of a tandem processing chamber, and using the first gas flow rate, controlling a second gas flow rate from the gas source through a second gas line coupled to a second processing region of the tandem processing chamber.

BRIEF DESCRIPTION OF THE DRAWINGS

So that the manner in which the above recited features, advantages and objects of the invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a plan-view of a prior art semiconductor batch-processing tool that may be used to advantage.

FIG. 4 is a diagrammatic view illustrating the gas flow control loop of the invention that may be used to advantage.

FIG. 5 is a diagrammatic view illustrating two gas flow control loops of the invention that may be used to advantage.

DETAILED DESCRIPTION OF THE PREFERRED EMBODIMENT

Figure 2A:
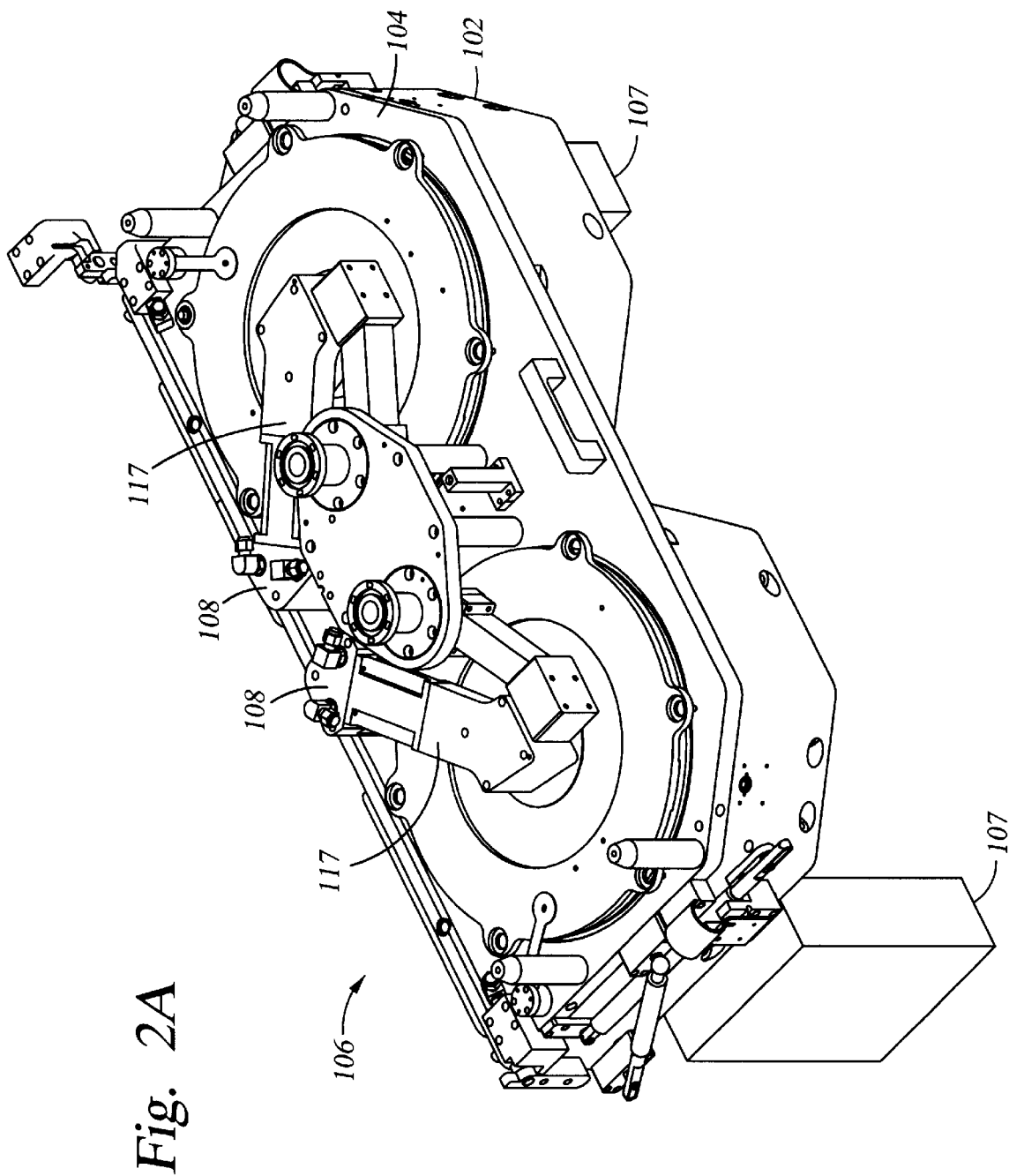
FIG. 2A is a top perspective view of a semiconductor batch-processing tool of FIG. 1 including a gas delivery system of the invention that may be used to advantage.

Aspects of the invention generally provide a fluid delivery system for controlling and dividing fluids such as process gases used in substrate processing. In accordance with one aspect of the invention, the system is a staged vacuum system which generally includes a load lock chamber for introducing substrates into the system, a transfer chamber for housing a substrate handler, and one or more processing chambers each having two or more processing regions which are isolatable from each other and preferably share a common fluid supply and a common exhaust pump. Isolatable means that the processing regions have a confined plasma zone separate from the adjacent region that is selectively communicable with the adjacent region via an exhaust system. The processing regions within each chamber also preferably include separate fluid distribution assemblies and RF power sources to provide a uniform plasma density over a substrate surface in each processing region. The processing chambers are configured to allow multiple, isolated processes to be performed concurrently in at least two regions so that at least two substrates can be processed simultaneously in separate processing regions with a high degree of process control provided by shared gas sources, shared exhaust systems, separate gas distribution assemblies, separate RF power sources, and separate temperature control systems. For ease of description, the terms processing region and chamber may be used to designate the zone in which plasma processing is carried out.

FIG. 1 is a plan view of one embodiment of a tandem semiconductor processing system 100 in which embodiments of the invention may be used to advantage. The arrangement and combination of chambers may be altered for purposes of performing specific fabrication process steps.

The tandem-chamber processing system 100 is a self-contained system having the necessary processing utilities supported on a mainframe structure 101 which can be easily installed and which provides a quick start up for operation. The substrate processing system 100 generally includes four different regions, namely, a front end staging area 102 where substrate cassettes 109 are supported and substrates are loaded into and unloaded from a loadlock chamber 112, a transfer chamber 111 housing a substrate handler 113, a series of tandem-process chambers 106 mounted on the transfer chamber 111 and a back end 138 which houses the support utilities needed for operation of the system 100, such as a gas panel 103, and the power distribution panel 105 for RF power generators 107. The system can be adapted to accommodate various processes and supporting chamber hardware such as CVD, PVD, etch, and the like.

Figure 2B:
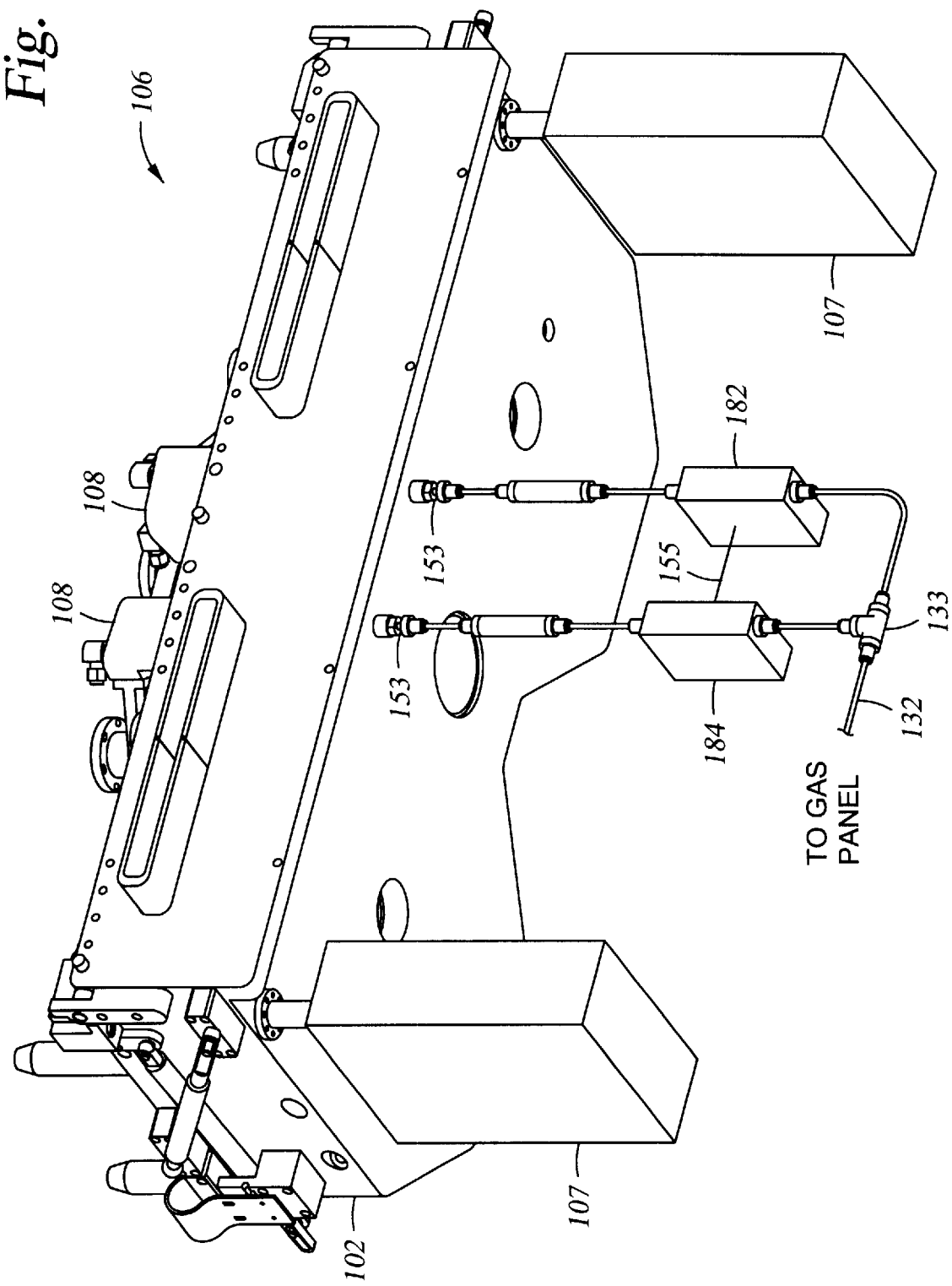
FIG. 2B is a bottom perspective view of the semiconductor batch-processing tool of FIG. 1 including a gas delivery system of the invention that may be used to advantage.

FIGS. 2A and 2B illustrate a perspective top view and bottom view respectively of one embodiment of a tandem-processing chamber 106 that includes the gas delivery system of the invention. The tandem-processing chamber 106 includes a chamber body 102 mounted or otherwise connected to the transfer chamber 111 and includes two cylindrical annular processing regions in which individual substrates are concurrently processed. The chamber body 102 supports a lid 104 that is hindgedly attached to the chamber body 102 and includes one or more gas distribution systems 108 for delivering reactant and cleaning fluids such as process gases and gas mixtures into the processing regions therein.

Figure 3:
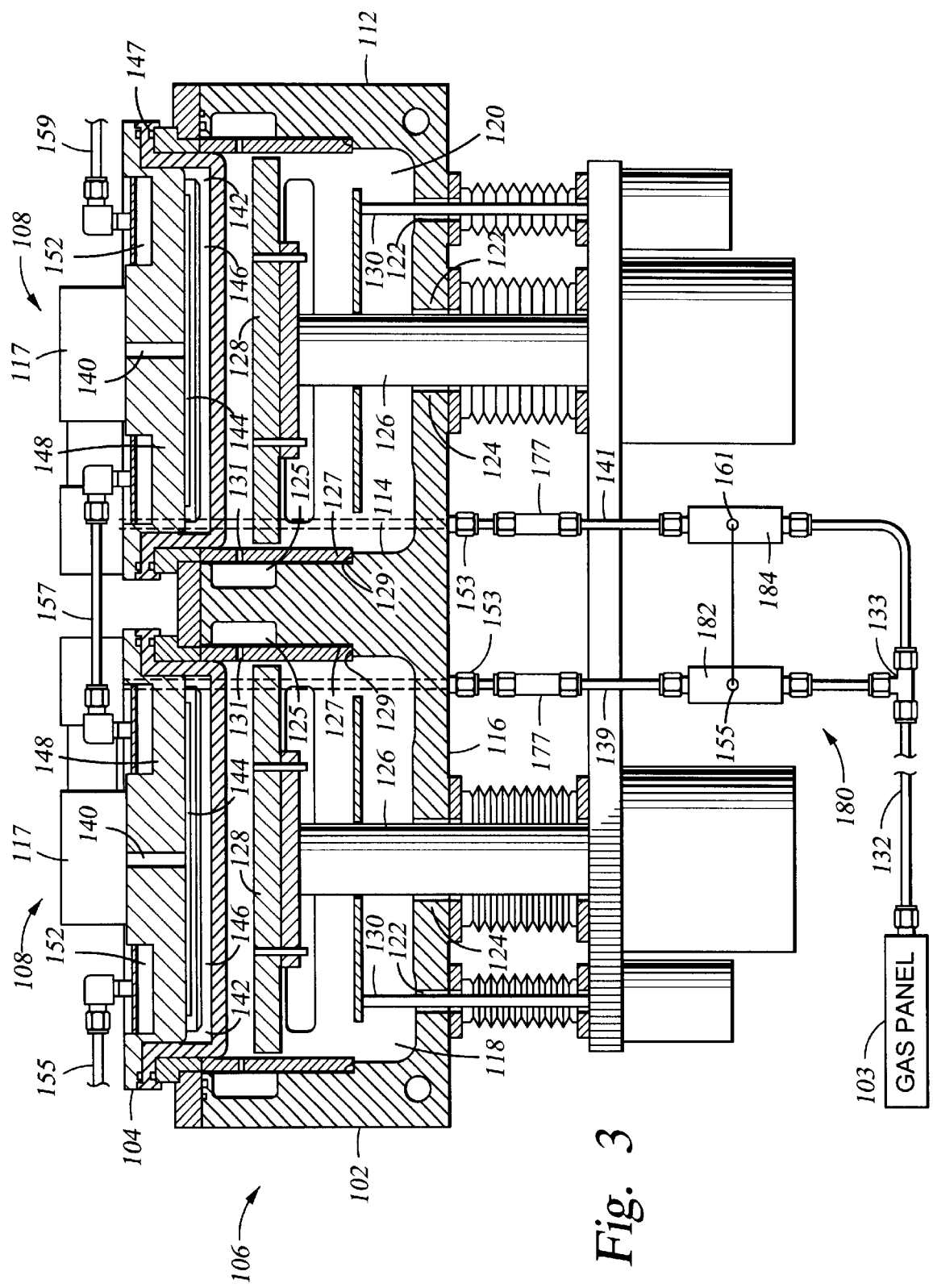
FIG. 3 is a cutaway view of the tandem-processing chamber of FIG. 1 including the gas delivery system of FIGS. 2A and 2B.

FIG. 3 shows a cross-sectional view of the tandem-processing chamber 106 for use with aspects of the invention. The tandem-processing chamber 106 includes a chamber body 102 having a sidewall 112, an interior wall 114, and a bottom wall 116. The sidewall 112 and the interior wall 114 define the two cylindrical annular processing regions 118, 120. The bottom wall 116 of the processing regions 118, 120 defines at least two passages 124, 122 through which a stem 126 of a pedestal heater 128 and a rod 130 of a substrate lift pin assembly are disposed, respectively. A circumferential pumping channel 125 is formed in the interior chamber walls 114 for exhausting gases and controlling the pressure within each region 118, 120. A chamber liner or insert 127, preferably made of ceramic, glass, quartz, or the like, is disposed in each processing region 118, 120 to define the lateral boundary of each processing region 118, 120 and to protect the chamber walls 112, 114 from the corrosive processing environment, and to maintain an electrically isolated plasma environment. The liner 127 is supported in the chamber on a ledge 129 formed in the walls 112, 114 of each processing region 118, 120. The liner includes a plurality of exhaust ports 131, or circumferential slots, disposed therethrough and in communication with the pumping channel 125 formed in the chamber walls where the pumping channel 125 is connected to a common vacuum source (not shown). Preferably, there are about forty-eight ports 131 disposed through each liner 127 which are spaced apart by about 7.5° and located about the periphery of the processing regions 118, 120. While forty-eight ports are preferred, any number can be employed to achieve the desired pumping rate and uniformity. In addition to the number of ports 131, the height of the ports 131 relative to the gas distribution system 108 is adapted to provide an optimal gas flow pattern over the substrate during processing. In addition, the chamber body 102 defines a plurality of vertical gas passages for each reactant gas and cleaning gas suitable for the selected process. The gasses are delivered through the vertical passages in the chamber body 102 into a gas distribution system 108 disposed through the chamber lid 104 to deliver gases into the processing regions 118, 120, from a gas source such as the gas panel 103.

The gas distribution system 108 of each processing region includes a gas inlet passage 140 that delivers process gases into a showerhead assembly 142 from a gas inlet manifold 117. The showerhead assembly 142 is comprised of an annular base plate 148 having a blocker plate 144 disposed intermediate a faceplate 146. A plurality of o-rings 147 are provided on the upper surface of the chamber walls 112, 114 around each gas passage to provide sealing connection with the lid 104. The lid 104 includes matching passages to deliver the gas from the vertical passages within the lower portion of the chamber 102 into the gas distribution system 108. Gas inlet connections 153 are disposed at the bottom 116 of tandem-processing chamber 106 to connect the gas passages formed in the chamber 102 to a first and a second gas delivery line 139, 141. In one aspect, the base plate 148 defines a gas passage therethrough to deliver process gases to a region just above the blocker plate 144. The blocker plate 144 disperses the process gases over its upper surface and delivers the gases above the faceplate 146. In one aspect, holes in the blocker plate 144 can be sized and positioned to enhance mixing of the process gases and distribution over the faceplate 146. The gases delivered to the faceplate 146 are then delivered into the processing regions 118, 120 in a uniform manner over a substrate positioned for processing.

In one aspect, an RF feedthrough (not shown) provides an electrical conduit through the walls 112, 114 to provide a bias potential to each showerhead assembly 142, facilitating the delivery of RF power for the generation of plasma between the faceplate 146 of the showerhead assembly and the heater pedestal 128. A cooling channel 152 is formed in a base plate 148 of each gas distribution system 108 to cool the base plate 148 during operation. A fluid inlet 155 delivers a coolant fluid, such as water or the like, into the channels 152 that are connected to each other by coolant line 157. The cooling fluid exits the channel through a coolant outlet 159. Alternatively, the cooling fluid is circulated through the manifold 117.

FIG. 4 is a diagrammatic view illustrating a gas flow control loop for the tandem-processing chamber 106 of FIGS. 1–3. As necessary, FIGS. 1–3 are referenced in the following discussion of FIG. 4.

Illustratively, one or more fluids such as process gases, or a mixture of process gasses, are supplied to the tandem-process chamber 106 from the gas panel 103 having a gas flow delivery system (GFD) 180 coupled to the gas delivery lines 139,141. In one aspect, the GFD 180 includes a splitter 133 such as a line splitter, t-type, and the like having a gas input coupled to a gas source line 132 from the gas panel 103. The splitter 133 includes a first splitter output 156 connected to a gas input 183 of a gas flow measuring apparatus (GFM) 182, such as a gas flow meter, mass flow meter (MFM), and the like, and a second splitter output 158. The GFM 182 includes a flow output 185 and one or more flow measurement signal outputs 155 adapted to provide flow measurement signals such as digital signals, analog signals, and the like, indicative of the amount of flow through gas delivery line 139. Further, the GFD 180 includes a gas flow control apparatus (GFC) 184, such as an adjust-able gas flow controller, orifice, venturi, or a valve, such as a gate valve, a ball valve, a pneumatic valve, and the like. The GFC 184 also comprises a gas control input 190 coupled to the second splitter output 158, a gas control output 191 coupled to the second gas delivery line 141, and a flow control input 161 coupled to and responsive to the flow measurement signal output 155 from the GFM 182. In one aspect, the signal level of the flow measurement signal output 155 of the GFM 182 is a function of the gas flow through gas line 139 measured by the GFM 182. For example, as the gas flow increases through the GFM 182, the flow measurement signal from the signal output 155 may increase in voltage or current. The gain of the flow control input 161 may be set such that a minimum voltage from the signal output 155 corresponds to a minimum flow and a maximum flow measurement signal output 155 corresponds to a maximum flow through the GFC 184. In another aspect, the gain of the flow control input 161 and flow measurement signal 155 have about the same flow range so the control signal output 155 indicates that the total flow from the gas line 131 is divided into about a fifty percent flow through the GFM 182 and through the GFC 184 in a steady state condition. Although it is preferred that the values of the minimum flow measurement signal 155 voltage is about zero volts and the maximum voltage is about 5 volts, it is contemplated that the flow measurement signal output 155 may be any value and type of signal such as voltage, current, power, electro-optical, or electromechanical, and the like. Further, it is contemplated that the flow measurement signal 155 may be a digital signal whereby the digital information controls the flow control input 161. For example, the digital signal may be in a byte format whereby the change in the byte value changes the flow through the GFC 184. In another aspect, a filter 177, such as a sintered nickel filter available from PALL or Millipore, is disposed in the gas line 132 upstream and/or downstream from the splitter 133. In still another aspect, the gas line 132 may be coupled to a mass flow controller within the gas panel 103 to establish a consistent input gas flow to the GFD 180.

FIG. 4 is merely one hardware configuration for a GFD 180. Aspects of the invention can apply to any comparable hardware configuration, regardless of whether the GFD 180 is a complicated, multi-gas delivery apparatus or a single gas delivery apparatus. For example, FIG. 5 illustrates combining two GFDs to provide two or more different fluids or mixtures of fluids to the tandem-processing chamber 106 where, for example, a fluid such as a process gas A is delivered by a first GFD 1180 and a second fluid such as a process gas B is delivered by a second GFD 181.

Figure 6:
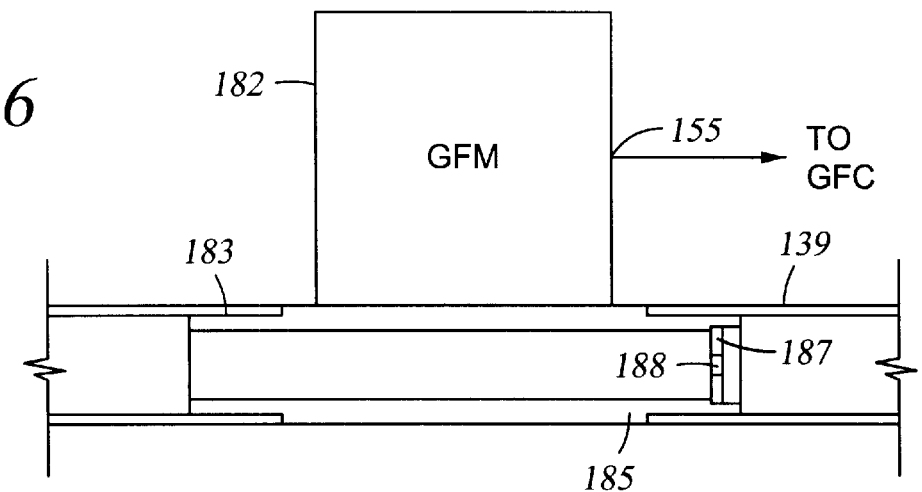
FIG. 6 is a diagrammatic view of one embodiment of a gas flow measuring apparatus illustrating a flow constriction of the invention that may be used to advantage.

FIG. 6 illustrates a diagrammatic view of one embodiment of a GFM 182. As necessary, FIGS. 1–5 are referenced in the following discussion of FIG. 6.

In one aspect, the GFM 182 includes a gas flow restriction 187 such as an orifice, block, valve, and the like, adapted to provide gas flow resistance. The restriction 187 is sized to set the desired flow rate through the gas delivery line 139 to establish a desired initial gas flow rate through both gas lines 139, 141 and provide a gas flow resistance through gas delivery line 139. The split gas lines 139, 141 share a common gas input 131 and are in communication through splitter 133 whereby the flow through each line equals about the total gas flow. Therefore, a flow restriction within either gas delivery line 139, 141 affects the gas flow through the other line. For example, if the gas flow were completely restricted through gas delivery line 139 and the gas delivery line 141 was unrestricted, then the gas would flow through gas delivery line 141. In one aspect, the gas flow restriction 187 includes an orifice 188 having an inner diameter of about 0.03 inches to about 0.06 inches to provide the gas flow resistance. Thus, as a process gas flows through the GFM 182, the gas flow from gas delivery line 139 is impeded by the gas flow restriction 187 creating backpressure within gas delivery line 139 causing process gas to flow through gas delivery line 141. In one aspect, the gas restriction 187 may be a fixed value or may be adjustable to further accommodate different process gases and flow requirements. In another aspect, the restriction 187 is a separate device coupled to any portion of gas line 139.

Fluid Flow Control

Figure 7:
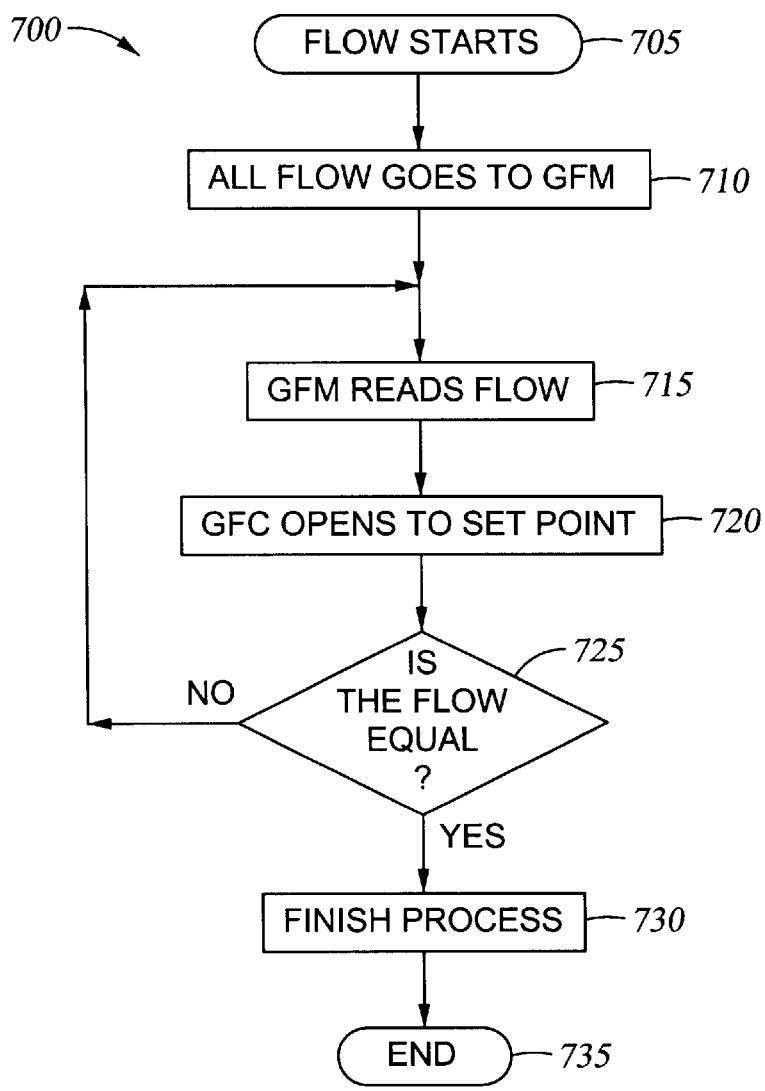
FIG. 7 is a flow diagram of the invention illustrating a method of gas flow control that may be used to advantage.

FIG. 7 is a flow diagram of one embodiment for a method 700 for fluid flow control for the tandem-processing chamber of FIG. 1 in accordance with aspects of the invention. As necessary, FIGS. 1–6 are referenced in the following discussion of FIG. 7.

FIG. 7 is entered at step 705 when, for example, a fluid such as a process gas is delivered from the gas line 131 to the GFD 180. At step 710, the GFC 184 is set to minimum flow and the GFM 182 is set to maximum flow. The process gas flows from the input gas line 131 to the splitter 133 and then to each gas delivery line 139, 141. Initially, due to the setting of the GFC 184 and GFM 182, the majority of the process gas flow occurs through the GFM 182. The flow through the GFM 182 is measured at step 715 and the corresponding flow measurement signal 155 is then transmitted to the flow control input 161. The flow measurement signal 155 then opens the flow of gas through the GFC 184. As the flow of process gas begins to flow through the GFC 184, the gas flow through the GFM is proportionally decreased. In one aspect, at step 725, the value of the flow measurement signal 155 corresponds to the input range of the flow control input 161 such that about fifty percent of the process gas flows through the GFM 182 and GFC 184. In one aspect, as the gas flows within the gas delivery lines 139, 141 are responsive to the gas flows of each other, and the GFM 182 controls the gas flow through the GFC 184 in accordance to the measured gas flow through the GFM 182, the individual flow through each gas delivery line 139, 142 is adjusted until the two flow rates are about equal and in equilibrium. Although, a fifty percent flow through each gas delivery line 139, 141 is preferred, other ratios of gas flows are contemplated to allow for variations between processing regions. If the gas flow rate is about identical through GFM 182 and GFC 184, the gas flow is continued until the process step is finished at step 730. Subsequently, the method 700 exits at step 735. Thus, the gas lines 139, 141, and the flow control signal define a closed loop gas control system responsive to the gas flow from the gas input 131 where a change in gas flow results in a proportional change in the gas flow rates through the gas lines 139, 141.

Example Process Parameters

In the described embodiment, the precursor gas may be any gas or gas mixture such as Trimethylsilane (TMS), $NF_3$, and the like, adapted to perform substrate processing operations. In one aspect, the flow rate of activated species is about 100 sccm to about 20 slm per minute and the chamber pressure is about 0.5 Torr to about 10.0 Torr. Within the deposition chamber, the RF sources supply about 200 watts to about 2000 watts to the plasma.

Though a RF generator is used in the described embodiment to activate the precursor gas, any power source that is capable of activating the precursor gas can be used. For example, the plasma can employ combinations of DC, radio frequency (RF), and microwave (MW) based discharge techniques. In addition, if an RF power source is used, it can be either capacitively or inductively coupled to the inside of the chamber. The activation can also be performed by a thermally based, gas breakdown technique, a high intensity light source, or an x-ray source, to name just a few.

In general, the reactive gases may be selected from a wide range of options. For example, the reactive gas may be chlorine, fluorine or compounds thereof that include carbon, oxygen, helium, or hydrogen, e.g. $CF_4$, $SF_6$, $CF_6$, $CCl_4$, $CCl_6$, $SIO_2$, etc. Of course, the particular gas that is used depends on the material that is being deposited.

Figure 8:
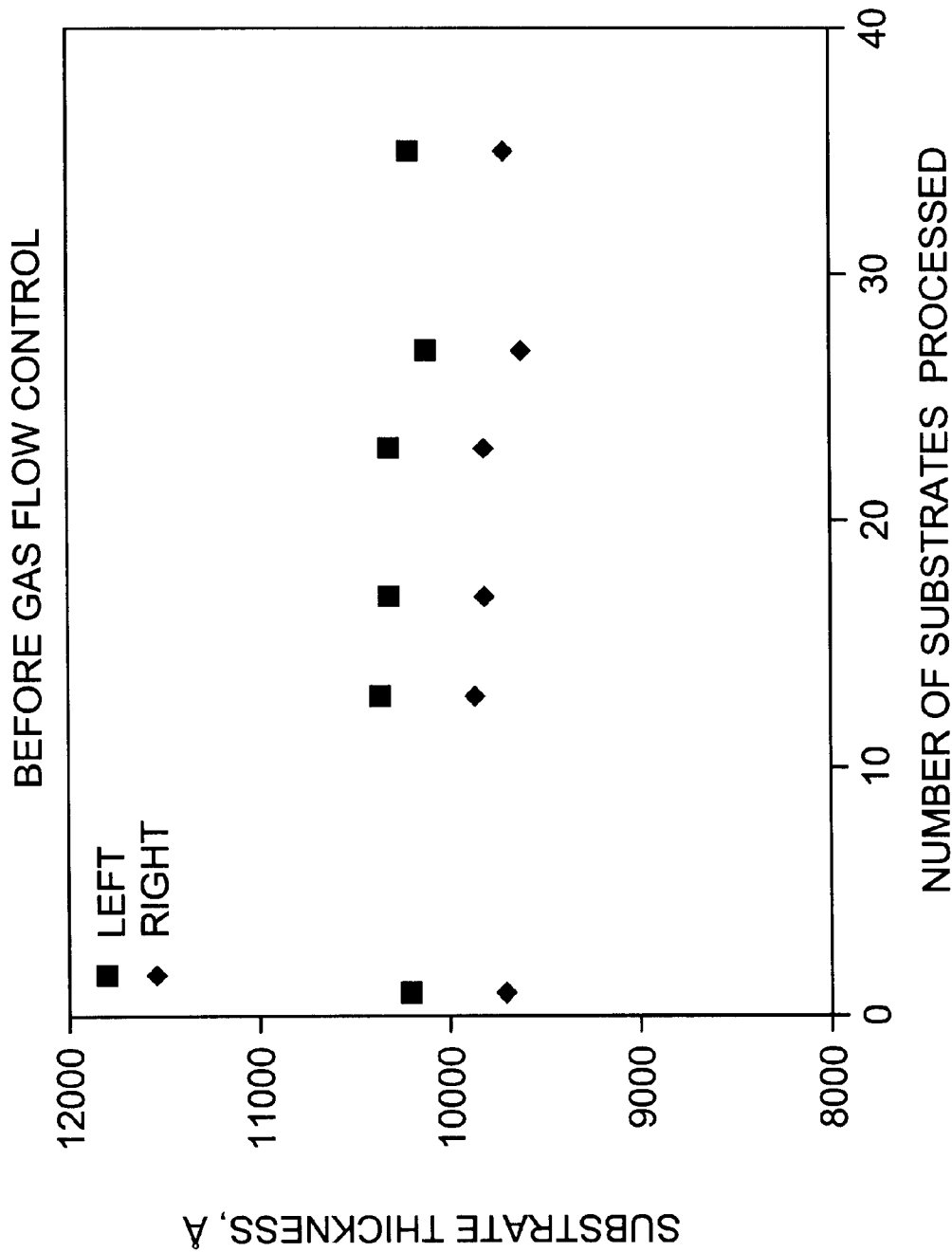
FIG. 8 is a graphical illustration of the results of an example tandem-chamber substrate deposition process without gas flow control.
Figure 9:
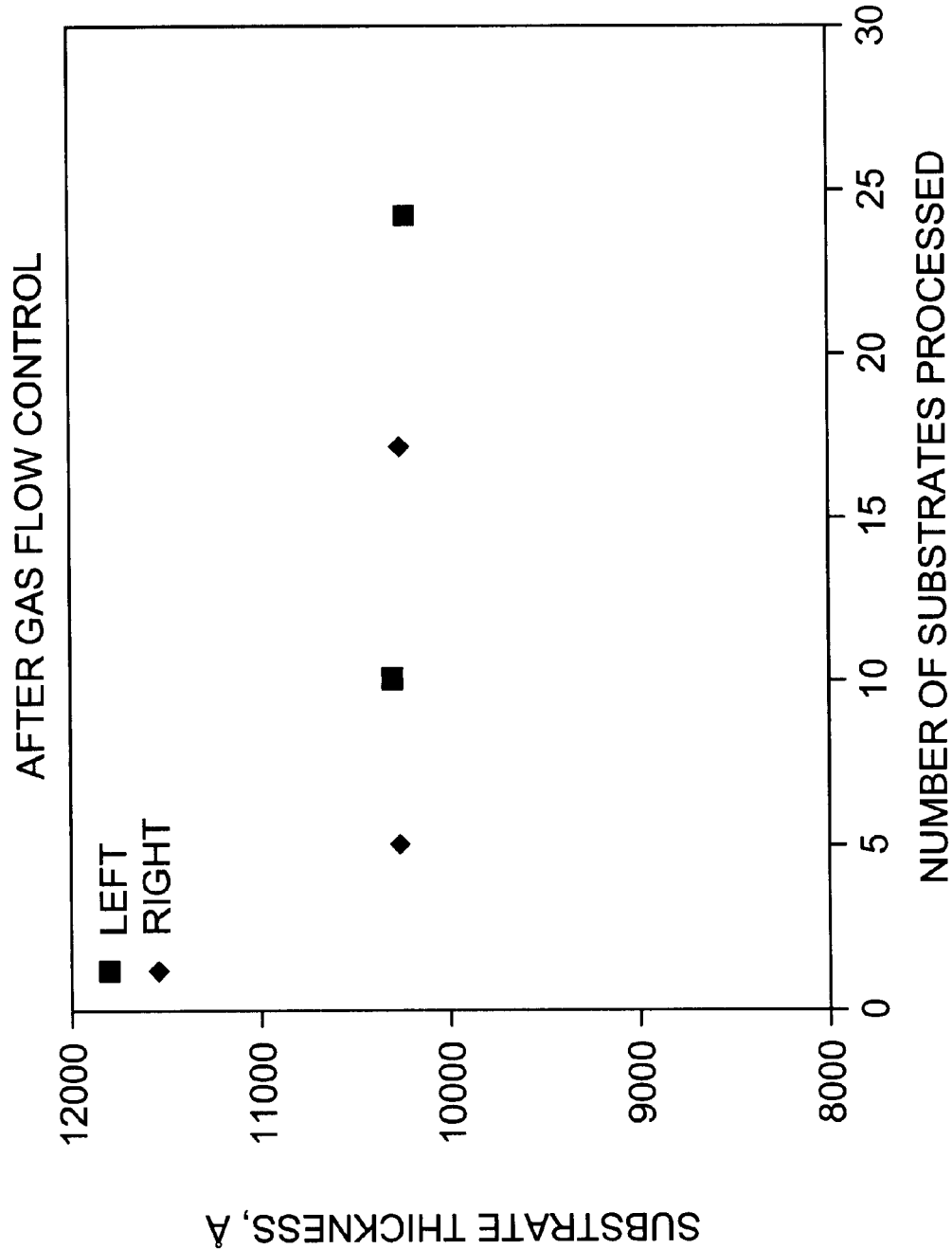
FIG. 9 is a graphical illustration of the results of an example tandem-chamber substrate deposition process of the invention that may be used to advantage.

FIGS. 8 and 9 illustrate one example of a tandem process performed with and without using the fluid flow control apparatus and method described above. The following table presents one example of chamber operating conditions for a deposition process performed in one embodiment of a tandem-chamber of the invention for both FIGS. 8 and 9. With reference to FIG. 8, the gas flow apparatus and method are not used. The left chamber and right chamber show a difference in substrate thickness of about 5%. With reference to FIG. 9, the gas flow apparatus and method are used. There is a less than about 1% difference in the substrate thickness variation between the left and right processing regions.

| Processing Parameter | Parameter Value |
| --- | --- |
| GAS: TMS | About 500 sccm to about 2000 sccm |
| GAS: $O_2$ | About 400 sccm to about 2000 sccm |
| Chamber Pressure | About 0.5 Torr to about 10 Torr |
| RF Power | About 400 W to about 2000 W |

Although various embodiments which incorporate the teachings of the invention have been shown and described in detail herein, those skilled in the art can readily devise many other varied embodiments within the scope of the invention. For example, more than two chambers may be used in tandem where the gas line is split in more than two gas delivery lines. In another embodiment, the process gas may be a mixture of gases where each gas is premixed with other gases and then flowed into the GFD 180. In still another embodiment, one or more fluids can be divided through both gas delivery lines 139, 141 and then brought to a gaseous phase within the tandem-processing chamber 106.

While foregoing is directed to the preferred embodiment of the present invention, other and further embodiments of the invention may be devised without departing from the basic scope thereof, and the scope thereof is determined by the claims that follow.

What is claimed is:

1. An apparatus for dividing a fluid flow from a fluid source, comprising:

a first fluid line connected to a fluid source;

a fluid flow meter positioned on the first fluid line to output a signal corresponding to a first fluid flow through the first fluid line;

a second fluid line connected to the fluid source; and a fluid flow controller positioned on the second fluid line for controlling a second fluid flow therethrough;

the fluid flow controller responsive to the signal from the fluid flow meter to controllably divide a fluid flow from the fluid source into the first fluid flow and second fluid flow, wherein the first fluid flow is inversely responsive to the second fluid flow.

2. The apparatus of claim 1, wherein the fluid flow controller comprises at least one flow control input responsive to the signal from the fluid flow meter.

3. The apparatus of claim 1, further comprising a tandem-processing chamber connected to the first fluid line and the second fluid line.

4. The apparatus of claim 1, wherein the fluid flow meter comprises a mass flow meter.

5. The apparatus of claim 1, wherein the fluid flow controller comprises a mass flow controller, a gate valve, a ball valve, a pneumatic valve, or combinations thereof.

6. The apparatus of claim 1, wherein the signal comprises a digital signal, an optical signal, a mechanical signal, an electrical signal, or combinations thereof.

7. The apparatus of claim 1, wherein the fluid flow controller equally divides the fluid flow between the first fluid line and the second fluid line.

8. The apparatus of claim 1, wherein the first fluid line, the second fluid line, and the flow control signal define a closed loop fluid control system responsive to the fluid flow rate through the first fluid line wherein a change in fluid flow from the fluid source results in a proportional change in the fluid flow rate through the first fluid line.

9. The apparatus of claim 1, wherein the fluid flow meter comprises a gas orifice adapted to provide gas flow resistance.

10. An apparatus for dividing a gas flow from a gas source output into a tandem-processing chamber, comprising:
  a first gas line connecting a gas source output to a first processing region of a tandem-processing chamber;
  a gas flow meter positioned on the first gas line to output a signal corresponding to a first gas flow through the first gas line;
  a second gas line connecting the gas source output to a second processing region of the tandem processing chamber; and
  a gas flow controller positioned on the second gas line and responsive to the signal from the gas flow meter to divide a gas flow from the gas source output between the first gas flow through the first gas line to the first processing region and a second gas flow through the second gas line to the second processing region, wherein the first gas flow and second gas flow are inversely responsive to one another.

11. The apparatus of claim 10, wherein the first and second processing regions are connected by a common vacuum source.

12. The apparatus of claim 10, wherein the gas source output is controlled by a mass flow controller.

13. The apparatus of claim 10, wherein the gas flow controller comprises at least one flow control input responsive to the signal from the gas flow meter.

14. The apparatus of claim 10, wherein the gas flow meter comprises a mass flow meter.

15. The apparatus of claim 10, wherein the gas flow controller comprises a mass flow controller, a gate valve, a ball valve, a pneumatic valve, or combinations thereof.

16. The apparatus of claim 10, wherein the signal comprises a digital signal, an optical signal, a mechanical signal, an electrical signal, or combinations thereof.

17. The apparatus of claim 10, wherein the first gas line, the second gas line, and the flow control signal define a closed loop gas control system responsive to the gas flow rate through the first gas line wherein a change in gas flow from the gas flow output results in a proportional change in the gas flow rate through the first gas line.

18. A method of dividing a fluid flow from a fluid source, comprising:
  measuring a first fluid flow through a first fluid line connected to the fluid source; and
  controlling a second fluid flow through a second fluid line connected to the fluid source using the first fluid flow through the first fluid line, wherein the first fluid flow and second fluid flow are inversely responsive to each other,
  wherein the first fluid line comprises a fluid flow measuring device that outputs a control signal, and the second fluid line comprises a fluid controller that receives the control signal.

19. The method of claim 18, wherein the fluid flow is equally divided between the first fluid line and the second fluid line.

20. The method of claim 18, wherein the fluid flow measuring device comprises a mass flow meter.

21. The method of claim 18, wherein the control signal comprises a digital signal, an optical signal, a mechanical signal, an electrical signal, or combinations thereof.

22. A method of dividing a gas flow in a tandem-processing chamber, comprising:
  measuring a first gas flow rate from a gas source through a first gas line coupled to a first processing region of a tandem-processing chamber; and
  using the first gas flow rate to control a second gas flow rate from the gas source through a second gas line coupled to a second processing region of the tandem-processing chamber, wherein changes to the first gas flow rate and the second gas flow rate are inversely proportional.

23. The method of claim 22, wherein the gas flow is equally divided between the first gas line and the second gas line.

24. The method of claim 20, wherein the first gas line comprises a gas flow measuring device that outputs a control signal, and the second gas line comprises a gas flow controller that receives the control signal.

25. The method of claim 24, wherein the gas flow measuring device comprises a mass flow meter.

26. The method of claim 24, wherein the gas flow controller comprises a mass flow controller, a gate valve, a ball valve, a pneumatic valve, or combinations thereof.

27. The method of claim 25, wherein the control signal comprises a digital signal, an optical signal, a mechanical signal, an electrical signal, or combinations thereof.

28. The method of claim 22, wherein the first gas line comprises a gas orifice adapted to provide gas flow resistance.

* * * * *

UNITED STATES PATENT AND TRADEMARK OFFICE
CERTIFICATE OF CORRECTION

PATENT NO.    : 6,591,850 B2
DATED         : July 15, 2003
INVENTOR(S)   : Rocha-Alvarez et al.

It is certified that error appears in the above-identified patent and that said Letters Patent is hereby corrected as shown below:

Column 6,
Line 48, please change "GFD 1180" to -- GFD 180 --.

Column 8,
Line 8, please change "$CF_6$" to -- $C_2F_6$ --.
Line 9, please change "$CCI_6$" to -- $C_2CI_6$ --.

Signed and Sealed this

Twenty-first Day of October, 2003

JAMES E. ROGAN
*Director of the United States Patent and Trademark Office*